United States Patent
Indukuru et al.

(10) Patent No.: US 9,495,170 B2
(45) Date of Patent: *Nov. 15, 2016

(54) DETERMINING EACH STALL REASON FOR EACH STALLED INSTRUCTION WITHIN A GROUP OF INSTRUCTIONS DURING A PIPELINE STALL

(71) Applicant: INTERNATIONAL BUSINESS MACHINES CORPORATION, Armonk, NY (US)

(72) Inventors: Venkat R. Indukuru, Austin, TX (US); Brian R. Konigsburg, Austin, TX (US); Alexander E. Mericas, Austin, TX (US); Benjamin W. Stolt, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 14/102,807

(22) Filed: Dec. 11, 2013

(65) Prior Publication Data

US 2014/0101416 A1   Apr. 10, 2014

Related U.S. Application Data

(63) Continuation of application No. 13/097,284, filed on Apr. 29, 2011, now Pat. No. 8,635,436.

(51) Int. Cl.
G06F 9/38 (2006.01)

(52) U.S. Cl.
CPC ........... *G06F 9/3867* (2013.01); *G06F 9/3853* (2013.01); *G06F 9/3855* (2013.01); *G06F 9/3857* (2013.01)

(58) Field of Classification Search
CPC .. G06F 9/3867; G06F 9/3853; G06F 9/3855; G06F 9/3857
USPC ........................................................ 712/227
See application file for complete search history.

(56) References Cited

U.S. PATENT DOCUMENTS 5,987,598 A   11/1999   Levine et al.
7,047,398 B2   5/2006   Kurihara et al.
(Continued)

OTHER PUBLICATIONS

Notice of Allowance, U.S. Appl. No. 13/097,284, filed 04-292-11, in re Indukuru, mailing date Sep. 11, 2013, 57 pages.

*Primary Examiner* — Andrew Caldwell
*Assistant Examiner* — Yuqing Xiao
(74) *Attorney, Agent, or Firm* — Amy J. Pattillo; Steven L. Bennett

(57) ABSTRACT

During a pipeline stall in a processor, until a next to complete instruction group completes, a monitoring unit receives, from a completion unit of a processor, a next to finish indicator indicating the finish of an oldest previously unfinished instruction from among a plurality of instructions of a next to complete instruction group. The monitoring unit receives, from functional units of the processor, finish reports including completion reasons for separate instructions. The monitoring unit determines at least one stall reason from among multiple stall reasons for the oldest instruction from a selection of completion reasons from a selection of finish reports aligned with the next to finish indicator from among the finish reports. Once the monitoring unit receives a complete indicator from the completion unit, indicating the completion of the next to complete instruction group, the monitoring unit stores each determined stall reason aligned with each next to finish indicator in memory.

12 Claims, 8 Drawing Sheets

(56) References Cited

U.S. PATENT DOCUMENTS

| | | |
|---|---|---|
| 7,617,385 B2 | 11/2009 | Indukuru et al. |
| 8,234,484 B2 | 7/2012 | Indukuru et al. |
| 2004/0024994 A1* | 2/2004 | Kurihara ............... G06F 9/3836 712/227 |
| 2008/0201566 A1 | 8/2008 | Indukuru et al. |
| 2008/0294881 A1 | 11/2008 | Chen et al. |
| 2009/0019317 A1 | 1/2009 | Quach et al. |
| 2009/0106539 A1 | 4/2009 | Mericas |
| 2009/0259830 A1 | 10/2009 | Indukuru et al. |
| 2011/0154298 A1* | 6/2011 | Alexander ............ G06F 11/348 717/130 |
| 2012/0124340 A1 | 5/2012 | Hardage |
| 2012/0278595 A1 | 11/2012 | Indukuru et al. |

* cited by examiner

DETERMINING EACH STALL REASON FOR EACH STALLED INSTRUCTION WITHIN A GROUP OF INSTRUCTIONS DURING A PIPELINE STALL

CROSS REFERENCE TO RELATED APPLICATIONS

This application is a continuation of commonly assigned U.S. patent application Ser. No. 13/097,284, filed Mar. 29, 2011, which is hereby incorporated herein by reference.

BACKGROUND

1. Technical Field

This invention relates in general to data processing system performance and more particularly, for a next to complete instruction group during a pipeline stall in an out of order processor, to identifying the finish of an oldest, previously unfinished instruction in the next to complete instruction group, aligning finish reports providing completion reasons from functional units with oldest instruction finish indicators, and determining each stall reason for each oldest instruction from the aligned finish reports.

2. Description of the Related Art

An instruction is generally executed in stages or components within a processor or processors. The components for completing execution of an instruction may perform functions including fetching the instruction, decoding the instruction, dispatching the instruction, issuing the instruction to appropriate functional unit, executing the instruction, and writing the result of the operation to memory and registers. When the result is written to memory and registers, the result of performing the operation becomes visible or available to other instructions and processes.

Data processing systems, and in particular processors within data processing systems, frequently experience stalls, which include any events that delay the completion of one or more instructions by a clock cycle or more, by the components. Stalls may occur for multiple reasons including, but not limited to, branch mispredictions, delay in accessing data due to cache misses, and high latency instructions, such as floating point operations.

Stalls reduce the overall performance of processors, and thus the overall performance of data processing systems. A significant number of stalls may seriously degrade processor performance. In processors that execute instructions out of order or speculatively, it is typically more convenient and accurate to study the performance of components after the instruction completes. By studying the performance of the components and identifying reasons for stalls, a user may attempt to make adjustments to correct a problem or reduce the number of stall cycles in a particular processor.

Determining the exact cause of instruction completion stalls after the instruction completes, however, increases in difficulty as the number of types of causes of instruction stalls increases, as the number of processors simultaneously handling instructions increases, and when processors execute instructions in an out-of-order manner.

In addition, determining the exact cause of instruction completion stalls after the instruction completes increases in difficulty when groups of instructions are processed in an out of order manner, but completed together, such as in a processor that completes groups of instructions in an instruction pipeline. Execution of a group of instructions in an instruction pipeline is not complete until every instruction in the group is complete. If completion of the group stalls, the stall cycles could be due to a delay occurring in any one or more of the instructions in the group, each in various stages of component execution. In addition, due to dependencies between instructions within the group, a stall in one instruction may block completion of dependent instructions, where the dependent instruction does not cause the stall, but the completion of the dependent instruction is delayed because of the stall.

BRIEF SUMMARY

In view of the foregoing, for instruction groups processed within a pipelined, out-of-order processor, there is a need to accurately determine each stall reason for each stalled instruction within a group of instructions during a pipeline stall as the instruction group executes, such that stall reasons determined by stalled instruction can be studied after the group of instructions completes.

According to one embodiment of the invention, during a pipeline stall in an out of order processor, until a next to complete instruction group completes, a monitoring unit receives, from a completion unit of a processor, a next to finish indicator indicating the finish of an oldest previously unfinished instruction from among a plurality of instructions of a next to complete instruction group. The monitoring unit receives, from a plurality of functional units of the processor, a plurality of finish reports including completion reasons for a plurality of separate instructions. The monitoring unit determines at least one stall reason from among multiple stall reasons for the oldest instruction from a selection of completion reasons from a selection of finish reports aligned with the next to finish indicator from among the plurality of finish reports. Once the monitoring unit receives a complete indicator from the completion unit, indicating the completion of the next to complete instruction group, the monitoring unit stores each determined stall reason aligned with each next to finish indicator in memory.

The completion unit tracks the next to complete instruction group and tracks the oldest unfinished instruction in each next to complete instruction group during a pipeline stall. As the completion unit receives finish reports from the functional units, the completion unit marks the finish of each instruction and sends the next to finish indicator when the oldest unfinished instruction in the next to complete instruction group is finished. As the completion unit detects the finish of the last unfinished instruction in a next to complete instruction group, the completion unit sends the complete indicator.

A dispatch unit receives instruction groups and tags instruction groups with group identifiers and tags each individual instruction with an individual instruction identifier. The completion unit and functional units both mark and track instructions by group tag and individual instruction tag.

When the monitoring unit detects a pipeline stall, the monitoring unit increments a counter for each cycle until a next to finish indicator is received and the next to finish indicator aligns with a finish report from a functional unit. A next to finish indicator aligns with a finish report from a functional unit when the unit identifier of the functional unit sent in the next to finish indicator matches the unit identifier in the finish report from the functional unit as received by the monitoring unit. The monitoring unit determines the at least one stall reason from the at least one matching finish report and accumulates the current count in the counter with count in the counters assigned to the at least one stall reason. In addition, the monitoring unit adds the current clock cycle count to a register for the next to finish indicator. When the monitoring unit receives the complete indicator, the monitoring unit stores the counts stored in the stall reason counters and stores the clock cycles for each next to finish indicator in a memory.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
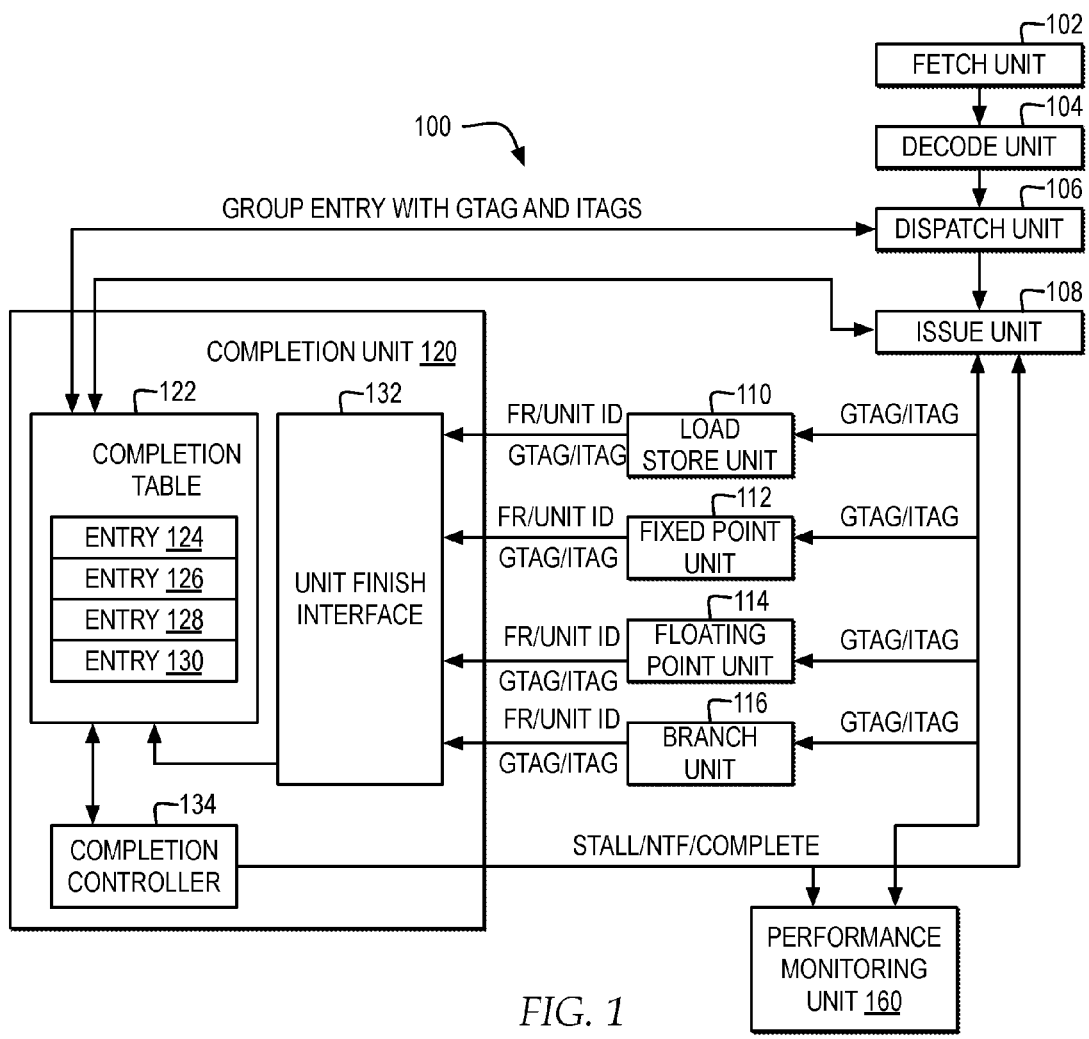
FIG. 1 is a block diagram illustrating one example of components of a completion unit of an out of order processor for tracking the finish of each oldest, unfinished instruction within a next to complete instruction group during a pipeline stall.

With reference now to the figures, FIG. 1 illustrates one example of components of a completion unit of an out of order processor for tracking the finish of each oldest, unfinished instruction within a next to complete instruction group during a pipeline stall. In the example, FIG. 1 illustrates a selection of components of a processor 100 for tracking each next to finish instruction within a next to complete instruction group and issuing indicators including a stall indicator, a next to finish indicator, and a complete indicator. In the illustrative embodiment, processor 100 is a superscalar microprocessor, including units, registers, buffers, memories, and other sections, shown and not shown, all of which are formed by integrated circuitry. It will be apparent to one skilled in the art that additional or alternate units, registers, buffers, memories and other sections may be implemented within processor 100 for full operation. In one example, processor 100 operates according to reduced instruction set computer (RISC) techniques.

In the example, processor 100 includes a fetch unit 102 that fetches instructions from one or more levels of cache and a decode unit 104 that decodes the fetched instructions. The type and level of decoding performed by decode unit 104 may depend on the type of architecture implemented. In one example, decode unit 104 decodes complex instructions into a group of instructions. It will be apparent to one skilled in the art that additional or alternate components may be implemented within processor 100 for holding, fetching and decoding instructions.

In the example, processor 100 includes a dispatch unit 106 for receiving decoded instructions or groups of decoded instructions from decode unit 104 and dispatching the instructions in groups, in order of their programmed sequence. In the example, dispatch unit 106 may receive a group of instructions tagged for processing as a group from decode unit 104. In another example, dispatch unit 104 may combine sequential instructions into an instruction group of a capped number of instructions. In one example, instruction groups may include one or more instructions dependent upon the results of one or more other instructions in the instruction group. In another example, instruction groups may include instructions that are not dependent upon the results of any other instruction in the group.

When dispatch unit 106 dispatches an instruction group, dispatch unit 106 assigns a group tag (GTAG) to the instruction group and assigns or associates individual tags (ITAGs) to each individual instruction within the dispatched instruction group. In one example, individual tags are assigned in sequential order based on the program order of the instruction group.

Dispatch unit 106 dispatches the instruction group tags to completion unit 120 for entry in completion table 122. In the example illustrated, completion table 122 includes multiple entries 124, 126, 128, and 130. Completion unit 120 manages the entries in completion table 122 to track the finish status of each individual instruction within an instruction group and to track the completion status of each instruction group. The finish status of an individual instruction within a next to complete instruction group may be used to trigger a performance monitoring unit 160 to store a stall reason and stall count in association with the instruction. The completion status of an instruction group in completion table 122 may be used for multiple purposes, including initiating the transfer of the results of the completed instructions to general purpose registers and triggering performance monitoring unit 160 to store the stall reasons and stall counters tracked for each instruction in the instruction group.

Figure 2:
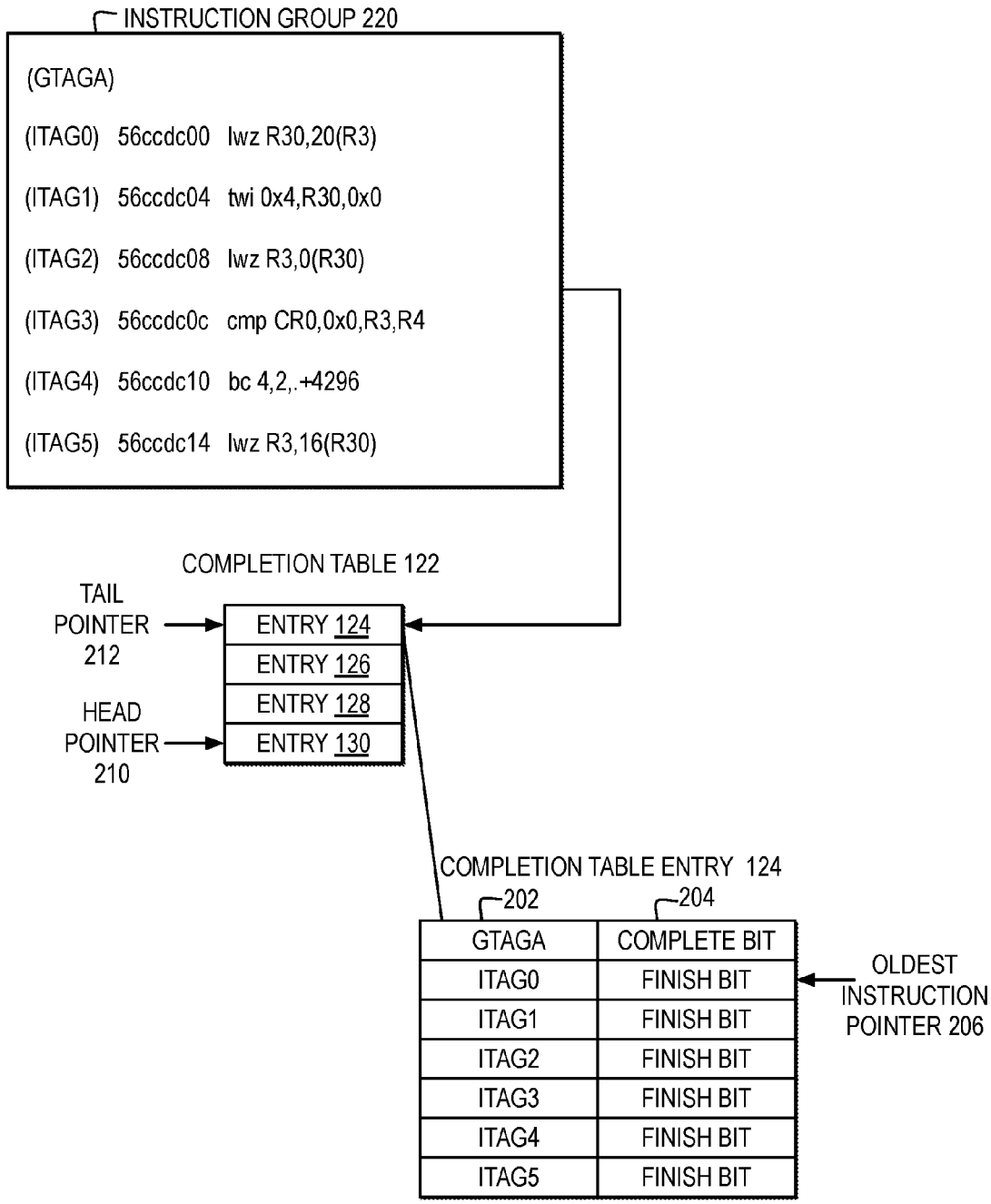
FIG. 2 is a block diagram depicting an example of a data structure for individual instruction finish status tracking and for instruction group completion status tracking within a completion table of a completion unit.

Referring now to FIG. 2, FIG. 2 illustrates an example of a data structure for individual instruction finish status tracking and for instruction group completion status tracking within a completion table of a completion unit. In the example, an instruction group 220 includes six instructions. In an alternate embodiment, instruction group 220 may include a different number of instructions.

Completion unit 120 tracks the completion status of instruction group 220 and the finish status of each instruction within instruction group 220 within completion table entry 124. In the example, instruction group 220 has been assigned a group tag (GTAG) "GTAGA". As illustrated, each instruction in instruction group 220 has been assigned a numbered instruction tag (ITAG). In the example, the ITAG numbering is sequentially ordered based on the program order of the instructions within instruction group 220, illustrated as "ITAG0", "ITAG1", "ITAG2", "ITAG3", "ITAG4", and "ITAG5".

In the example, completion table entry 124 includes tag identifiers 202 and status bits 204 for each tag identifier. In the example, a first tag GTAGA identifies the group tag identifier for instruction group 220. A status bit assigned to the group tag is labeled a "complete bit" and indicates whether the group of instructions is complete. In addition, in the example, the additional tags ITAG0, ITAG1, ITAG2, ITAG3, ITAG4, and ITAG5 identify the individual instruction tags for the individual instructions within the instruction group. A separate status bit associated with each instruction tag is labeled a "finish bit" and indicates whether the instruction has finished. In an alternate embodiment, the individual instruction tags may represent placeholders for finish bits for each instruction. Additional or alternate data structures may be implemented within a completion table entry to track the status of an instruction group and the status of each individual instruction within the instruction group.

Returning to FIG. 1, dispatch unit 106 also dispatches tagged instruction groups to issue unit 108. In the example, issue unit 108 handles dispatch of instructions for simultaneous processing in multiple functional units. Issue unit 108 may include a sequencing unit for controlling the sequence of instruction execution, may include queues specified for each type of function unit for holding dispatched instructions until the instructions are ready to be issued to the functional unit, and may track the completion order of instructions within an instruction group in completion table 122 or in a separate completion buffer. In the example, issue unit 108 dispatches the individual instructions of an instruction group, each tagged with GTAG and ITAG identifiers, to units each specified for handling particular types of instructions. In the example, the functional units for handling particular types of instructions include, but are not limited to, load store unit 110 for handling load store type instructions, fixed point unit 112 for handling fixed point type instructions, floating point unit 114 for handling floating point type instructions, and branch unit 116 for handling branch type instructions. Each of load store unit 110, fixed point unit 112, floating point unit 114, and branch unit 116 may include multiple registers, buffers, memories, and logic to perform the functions of the particular functional unit. Processor 100 may include additional or alternate types of functional units and processor 100 may include multiple instances of one or more of the types of unit, along with registers, buffers, memories and other units for processing instructions.

Each of the functional units, including load store unit 110, fixed point unit 112, floating point unit 114, and branch unit 116, is assigned a separate unit identifier (unit ID) to identify the particular functional unit. Each of load store unit 110, fixed point unit 112, floating point unit 114, and branch unit 116 reports the finish of an instruction, with the instruction's GTAG and ITAG and the functional unit's unit ID, to a unit finish interface 132 of completion unit 120.

As unit finish interface 132 of completion unit 120 receives a finish report from a functional unit with a GTAG and ITAG of a finished instruction and unit ID for the functional unit, unit finish interface 132 sets the finish bit assigned to the reported GTAG and ITAG in completion table 122. By setting the finish bit for an individual instruction, unit finish interface 132 tracks, in completion unit 120, the finish status of each individual instruction of an instruction group. In particular, in the example, instructions are fetched and dispatched as instruction groups in a program order, but are issued out of order by issue unit 108. Completion unit 120 receives indications of instruction completion out of order and waits for finish bits to be set for all instructions in an instruction group before the instruction group can complete.

A completion controller 134 monitors completion table 122 to detect the completion of each instruction group. In one example, as illustrated in FIG. 2, when completion controller 134 detects that all the finish bits for all the instructions in an entry are set, completion controller 134 sets the complete bit in the entry for the group, such as setting the complete bit for "GTAGA".

In addition, completion controller 134 monitors completion table 122 to detect the completion of the next to complete instruction group in completion table 122. In one example, as illustrated in FIG. 2, completion controller 134 implements a head pointer 210 to point to the newest entry in completion table 122 and implements a tail pointer 212 to point to the oldest entry in completion table 122. Tail pointer 212 points to the oldest, next to complete instruction group. When completion controller 134 detects a complete bit set in an entry and tail pointer 212 is pointing to the entry, completion controller 134 detects all the instructions in an instruction group are finished and the instruction group is the oldest, and completion controller 134 issues a complete indicator to a performance monitoring unit 160 and to other units within processor 100.

In the example, tail pointer 212 points to the next to complete instruction group. When completion controller 134 issues a complete indicator for an instruction group, completion controller 134 moves tail pointer 212 to point to the next oldest, not yet complete entry in completion table 122. For example, when completion controller 134 issues a complete indicator for entry 124, completion controller moves tail pointer 212 to point to entry 126. If entry 126 does not already have the complete bit set, the completion controller monitors for the finish of all the instructions in the next to complete instruction group tracked by entry 126. If entry 126 already has the completion bit set, completion controller 134 issues a complete indicator for entry 126 and moves tail pointer 212 to point to entry 128.

Completion controller 134 detects that an instruction group is next to complete, but the pipeline has stalled for the next to complete instruction group. In one example, completion controller 134 detects a pipeline stall during any clock cycle when at least one instruction for a next to complete instruction group does not finish. In the example, completion controller 134 sends a stall indicator to performance monitoring unit 160 indicating a pipeline stall has occurred, delaying the completion of the next to complete group.

In addition to tracking which instruction group is next to complete, completion controller 134 also tracks which instruction is the next to finish, oldest instruction of the next to complete group in completion table 122. In one example, the next to finish instruction is the oldest instruction that has not yet finished in the next to complete group. In one example, completion controller 134 tracks a next to finish instruction of the next to complete group using an oldest instruction pointer 206, as illustrated in FIG. 2, which points to the tag for the oldest instruction that has not yet finished in the next to complete group.

After completion controller 134 sends a stall indicator, completion controller 134 monitors for a finish report for the instruction tracked as the next to finish, oldest instruction. When completion controller 134 detects a finish report for the next to finish instruction after a stall, completion controller 134 sends a next to finish indicator to a performance monitoring unit 160 indicating the finished instruction is the oldest, previously unfinished instruction and including the unit ID of the functional unit that sent the finish report.

In the example, instructions may finish out of order, therefore when an instruction finishes and the finish bit for the instruction is marked in completion table entry 124, if the finished instruction is not pointed to by oldest instruction pointer 206, completion controller 134 does not send a next to finish indication for the instruction. In one example, oldest instruction pointer 206 points to ITAG0, but the instruction tagged with ITAG1 may finish before the instruction tagged with ITAG0. In this example, once the instructed tagged with ITAG0 finishes, the finish bits for both ITAG0 and ITAG1 are set, therefore completion controller 134 moves oldest instruction pointer 206 to point to ITAG2. In this example, completion controller 134 sends a next to finish indicator for ITAG0, but no next to finish indicator is sent for ITAG1 because it finishes before the next to finish instruction and is passed over. By sending next to finish indicators only when an instruction finishes that is the oldest, previously unfinished instruction, rather than sending an indicator each time an instruction finishes, performance monitoring unit 160 is triggered to update stall reason counters only for a next to finish instruction, rather than for every instruction that finishes.

As illustrated, each of the functional units sends a finish report (FR) for each finished instruction. The finish report may include multiple types of information including, but not limited to, the GTAG and ITAG for a finished instruction, the functional unit ID, and completion reasons. In one example, as previously described, unit finish interface 132 reads the GTAG, ITAG, and function unit ID from the finish report. In addition, in one example, performance monitoring unit 160 reads the function unit ID and completion reasons from the finish report, where the completion reasons provides performance monitoring unit 160 with information about the finished instruction for performance monitoring unit 160 to use in determining a stall reason in correlation with the next to finish indicator from completion controller 134.

Operation of processor 100 is monitored using performance monitoring unit 160, which in one example is a software-accessible mechanism capable of providing detailed information descriptive of the utilization of instruction execution resources and storage control. Performance monitoring unit 160 may couple with each unit of processor 100 to permit the monitoring of all aspects of the operation of processor 100, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. In one example, performance monitoring unit 160 represents a hardware element integrated within processor 100. In another example, performance monitoring unit 160 represents a hardware and software element installed to monitor processor 100.

The elements illustrated within processor 100 are depicted to illustrate one example of the types of elements implemented within processor 100 to enable completion unit 120 to track both next to complete instruction groups and next to finish instructions within a next to complete instruction group and it will be apparent to one skilled in the art that processor 100 may include additional or alternate elements for tracking next to complete instruction groups and next to finish instructions within a next to complete instruction group. It will be apparent to one skilled in the art that the connections between units are provided by a bus system and that processor 100 may include additional or alternate buses connecting units. In addition, it will be apparent to one skilled in the art that processor 100 may include additional or alternate units and may process data in synchronization with additional processor cores and multiprocessor units.

Figure 3:
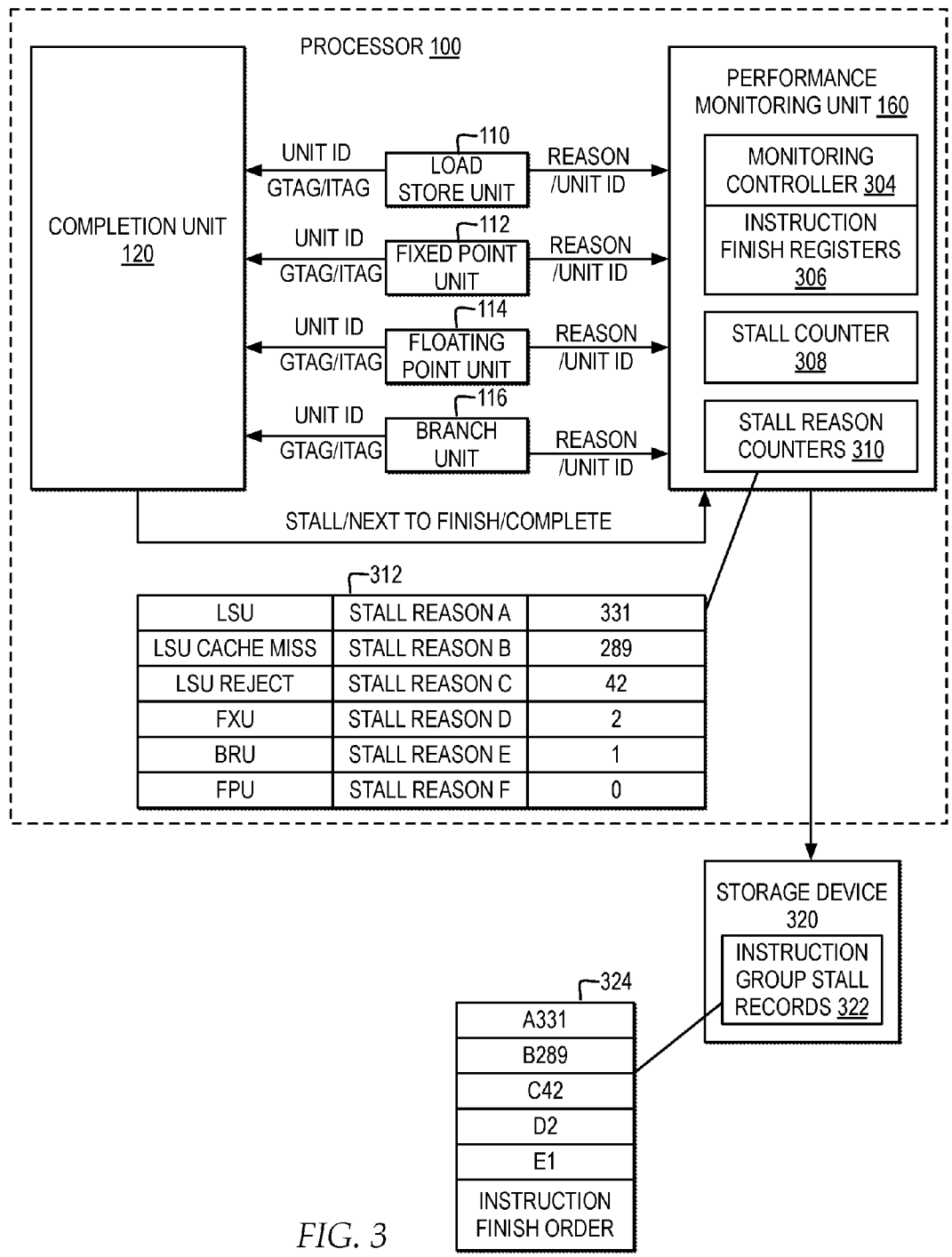
FIG. 3 is a block diagram illustrating an example of a performance monitoring unit for determining stall reasons and cycle counts for next to finish instructions of a next to complete instruction group.

Referring now to FIG. 3, a block diagram illustrates an example a performance monitoring unit for determining stall reasons and cycle counts for next to finish instructions of a next to complete instruction group. In the example, performance monitoring unit 160 includes multiple counters, registers, and logic which are used to track and count the occurrence of selected events, in addition to one or more units and other elements.

In one example, processor 100 operates as a RISC processor, capable of completing the execution of one or more instructions during a single processor clock cycle. In one example, an instruction is complete when the result is written to memory and/or a register, at which time the result becomes visible or available to other instructions and independent processes. When an instruction is consuming a relatively large number of processor cycles to reach completion or fails to reach completion, the cycles consumed without an instruction completing are referred to as stall cycles. As previously described with reference to FIG. 1, in processor 100, the execution of an instruction group is not complete until every instruction in the group is complete. If completion of the instruction group stalls, the stall could be due to a stall occurring in any of the instructions in the instruction group.

Since a pipeline stall could be caused by a stall occurring in any of the instructions in the instruction group, tracking stall reasons alone, without tracking information that correlates the stall reason to a particular instruction in the instruction group, provides limited information to software for analysis and correction of stall issues. In addition, since an instruction group may stall for multiple reasons, tracking multiple stall reasons and tracking stalled instructions, without tracking which stall reasons correlate with which stall cycles also provides limited information for correcting stall issues. Further, since tracking stall reasons while instructions are being processed uses processor resources, tracking the finish report for every finished instruction consumes resources, since not all instructions in an instruction group may trigger a stall. Therefore, to facilitate tracking each instruction within an instruction group that causes a stall and the reason for each stall, as described with reference to FIG. 1 and FIG. 2, completion unit 120 tracks when the next to finish instruction of the next to complete instruction group finishes and issues a next to finish indicator. Performance monitoring unit 160 receives next to finish indicators from completion unit 120. Performance monitoring unit 160 only stops a stall counter and determines a stall reason from the finish reports from functional units for finish reports of instructions triggering a next to finish indicator, when a next to finish instruction finishes. By stopping a stall counter and determining a stall reason for next to finish instructions only, performance monitoring unit 160 properly correlates stall reasons and stall cycles with instructions in an out of order processor. Software reading the stall reasons and stall cycles recorded for next to finish instructions is provided with information for correlating stall reasons to particular instructions of an instruction group.

In the example, performance monitoring unit 160 includes a monitoring controller 304. When monitoring controller 304 detects a stall indicator from completion unit 120, monitoring controller 304 starts stall counter 308. Performance monitoring unit 160 may implement multiple stall counters, each assigned to a particular completion unit or other unit within processor 100.

While stall counter 308 is counting each cycle, monitoring controller 304 waits for a next to finish indicator from completion unit 120. When monitoring controller 304 receives a next to finish indicator with a unit ID, monitoring controller 304 compares the unit ID in the next to finish indicator with the unit IDs in the finish reports received from the functional units for the cycle. If monitoring controller 304 detects a match between the unit ID in the next to finish indicator and the unit ID in the finish report, monitoring controller 304 pauses stall counter 308, determines the stall reason type from the functional unit ID and instruction info, stores the count from stall counter 308 in a cumulative stall reason counter for the stall reason type within stall reason counters 310, and resets stall counter 308. Although not depicted, in an alternate embodiment, each of stall reason counters 310 may implement a separate stall counter for charging and resetting to properly accumulate stall cycle counts.

In particular, monitoring controller 304 detects the completion reasons in the matching finish report, where completion reasons provide information used by monitoring controller 304 to determine one or more stall reasons. Examples of instruction info within a finish report may include, but are not limited to, a thread ID, a cache missing including the cache miss source (e.g. local core cache, on chip cache, local memory, off chip cache, off chip memory), store, load, long latency fixed point, long latency floating point, branch, translation miss, and reject.

As illustrated at reference numeral 312, stall reason counters 310 may include a separate counter for each type of stall reason including, but not limited to, thread stall, cache miss stall, store stall, load stall, long latency fixed point stall, long latency floating point stall, branch stall, translation miss stall, and reject stall. In addition, stall reason counters 310 may be further specified by the source of stalls, such as including separate counters for each of a cache miss from local core cache stall, a cache miss from on chip cache stall, a cache miss from local memory stall, a cache miss from off chip cache stall, and a cache miss from off chip memory stall. In the example, for purposes of illustration, a stall reason A is associated with a load store stall, stall reason B is associated with a load store stall with a cache miss, stall reason C is associated with a load store stall with a reject, stall reason D is associated with a fixed point unit stall, stall reason E is associated with a branch unit stall, and stall reason F is associated with a floating point unit stall.

As illustrated at reference numeral 312, by storing a separate count for each stall reason as triggered by a next to finish indicator, performance monitoring unit 160 not only tracks stall reasons for each stall for an instruction group, but also separately tracks the count in the stall counter for each stall reason for a completed instruction group and cumulatively tracks the stall cycle counts for stall reasons for particular functional units. In the example, stall reasons A, B and C are assigned to load store unit stalls, where stall reason A is a cumulative count of 331 the cycles counted for the "LSU cache miss" of 289 and the "LSU reject" of 42. In addition, in the example, stall reason D is assigned to fixed point unit stalls and includes a count of 2 and stall reason E is assigned to branch unit stall and includes a count of 1.

In one example, monitoring controller 304 determines one or more stall reasons for a next to finish instruction stall from the completion reasons received in the finish report by determining one or more stall reasons assigned to a particular type of completion reason. For example, monitoring controller 304 determines a stall reason of "cache miss stall" when the finished instruction unit ID from a functional unit matches the next to finish unit ID from the completion unit and the completion reason for the finished instruction is "load that missed cache". In another example, monitoring controller 304 determines a stall reason of "store stall" when the finished instruction unit ID from a functional unit matches the next to finish unit ID from the completion unit and the completion reason for the finished instruction is "store".

In the example, when monitoring controller 304 receives a complete indicator, monitoring controller 304 stores a record of the set stall reason counters and counts from stall reason counters 310 with a record of the instruction completion order. In one example, monitoring controller 304 stores the instruction group stall records in a storage device 320, as illustrated at reference numeral 322. Storage device 320 may represent multiple types of storage devices including, but not limited to, on chip cache, local memory, off chip cache, off chip memory, random access memory, or another storage medium.

In tracking the instruction finish order for the instruction group, in one example, issue unit 108 tracks the order that instructions finish from functional units 110, 112, 114, and 116 with the cycle completed, and performance monitoring unit 160 reads instruction completion order information from completion unit 120. In another example, in tracking the instruction finish order for the instruction group, when monitoring controller 304 receives the next to finish indicator, monitoring controller 304 also updates instruction finish registers 306 with the effective address of the finished instruction indicated by the next to finish indicator, the current clock cycle, and other information about the finished instruction, to effectively track the finish order of next to finish instructions for each next to finish indication. In one example, performance monitoring unit 160 may store the information from instruction finish registers 306 in storage device 320 upon receipt of each next to finish indication. In another example, performance monitoring unit 160 may include multiple registers for storing information for each instruction in an instruction group and may store the information from instruction finish registers 306 in storage device 320 upon receipt of a complete indicator.

As illustrated at reference numeral 324, a stall record is stored for instruction group 220 and includes the count for stall reason A, the count for stall reason B, the count for stall reason C, the count for stall reason D, and the count for stall reason E, along with the instruction finish order and additional information. Performance monitoring unit 160 may store additional or alternate information with each group stall record in instruction group stall records 322. In addition, performance monitoring unit 160 may identify the instruction group by the last instruction in the group, the GTAG for the group, the last clock cycle for the group, or another type of data that enables stall analysis software to identify the instruction group.

Figure 4:
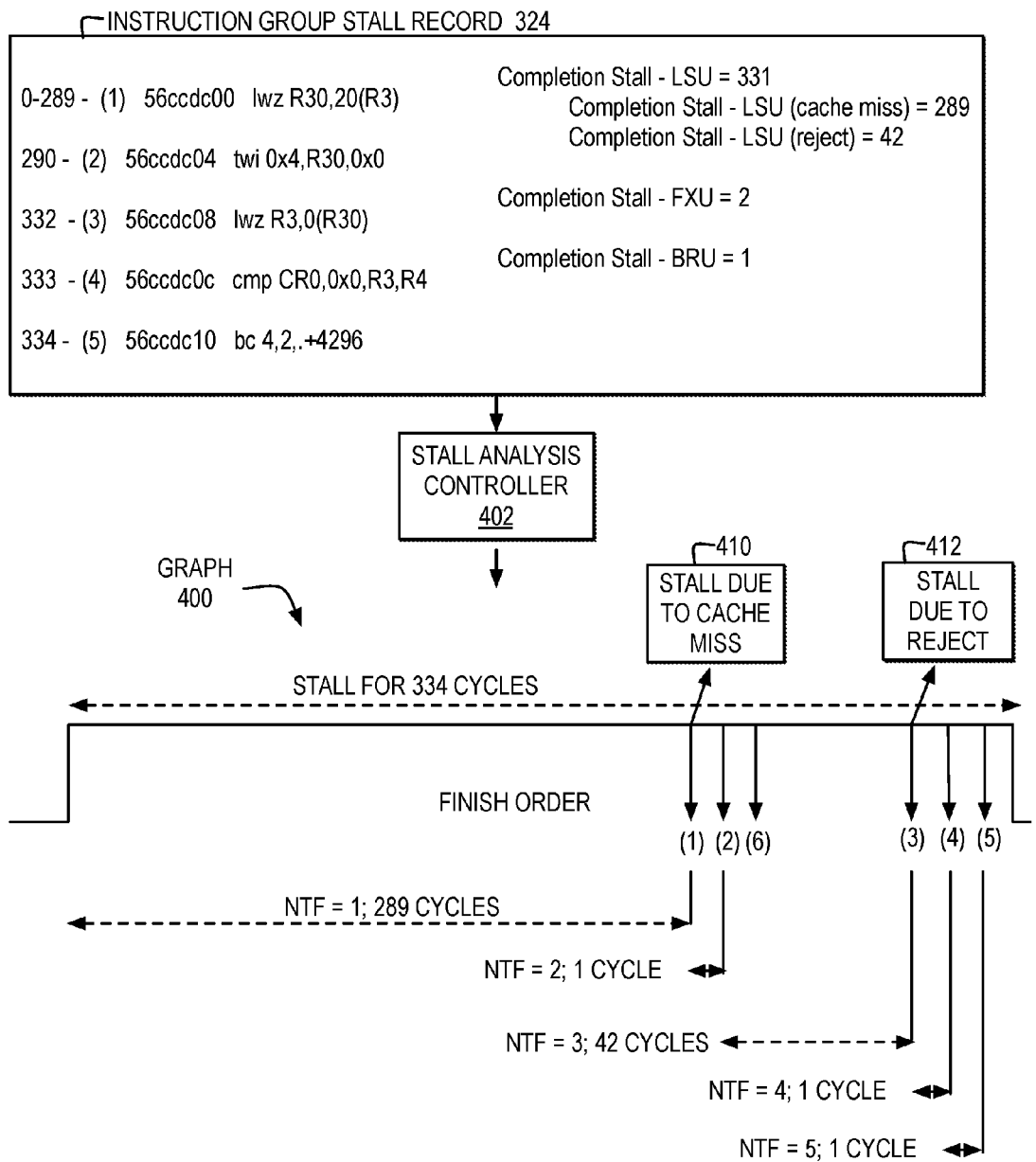
FIG. 4 is a block diagram depicting one example of a next to finish based stall analysis of an instruction group stall record.

Referring now to FIG. 4, a block diagram illustrates one example of a next to finish based stall analysis of an instruction group stall record. In one example, a stall analysis controller 402 accesses instruction group stall record 324 and analyzes each recorded stall reason and associated stall count cycle, with the order of instruction completion for the instruction group, to precisely breakdown stall cycles and stall reasons by instruction in an instruction group. As illustrated, stall analysis controller 402 aligns the completion stall counts and reasons with the instruction completion order and cycles for next to finish instructions in instruction group stall records 324.

In the example, the finish order of the instructions is illustrated in instruction group stall record 324 with respect to a numerical indicator indicating the original order of the instructions in instruction group 220 and includes a cycle at which the instruction finish was recorded, along with the original cycle at which the instruction group started, which may also be identified from the last cycle of the instruction group that previously completed. It will be understood by one with skill in the art that other naming conventions may be implemented to identify each instruction within an instruction group. In addition, it will be understood by one with skill in the art that the cycle numbers illustrated are for purposes of illustration and that additional offsets may be tracked.

In the example, the instruction group originally included six instructions, but a next to finish indicator was not issued for instruction 6 and a finish cycle was not reported for instruction 6 in instruction group stall record 324. In one example, a next to finish indicator is not issued for instruction 6 because instruction 6 is not dependent upon the completion of any other instructions and instruction 6 was finished out of order, as illustrated in graph 400. In the example illustrated, completion of instruction 4 and instruction 5 was dependent upon completion of instruction 3, so each of instruction 4 and instruction 5 could not finish until instruction 3 finished, as illustrated in graph 400.

In particular, in the example, stall analysis controller 402 may generate a graph 400 reflecting the order of instruction finishes, showing the relative finish times of the instructions and correlating stall reasons with particular instructions. In the example, stall analysis controller 402 may generate graph 400 reflecting the instructions that triggered next to finish indicators and the clock cycle each instruction finished, as illustrated by instruction 1 at cycle 289, instruction 2 at cycle 290, instruction 3 at cycle 332, instruction 4 at cycle 333 and instruction 5 at cycle 334.

Stall analysis controller 402 analyzes the stall reasons and cycle counts from instruction group stall record 324 and properly assigns the stall reasons of "LSU (cache miss)" and "LSU (reject)" to the instructions causing the stall. In the example, stall analysis controller 402 correlates the completion stall reason of "LSU (cache miss)" with a count of 289 with instruction 1, which has a clock cycle reflecting a 289 cycle delay from the start cycle. Stall analysis controller 402 determines that the stall correlated with instruction 1 is a stall due to cache miss, as illustrated at reference numeral 410. In addition, stall analysis controller 402 correlates the completion stall reason of "LSU (reject)" with a count of 42 with instruction 3, which has a clock cycle reflecting a 42 cycle delay from the clock cycle for instruction 2. Stall analysis controller 402 determines that the stall correlated with instruction 3 is a stall due to a reject in the load store unit, as illustrated at reference numeral 412.

In the example, instruction 2 is dependent upon instruction 1 and instructions 4 and 5 are dependent upon instruction 3, and each of these instructions were effectively delayed because of the stall conditions for instructions 1 and 3. Stall analysis controller 402, however, receives stall information recorded for each next to finish indicator, which allows stall analysis controller 402 to correctly assign the stall conditions to instruction 1 and instruction 3.

In the example, next to finish indicators were received for each of instructions 2, 4, and 5 and instruction group stall record 324 includes a record for each of these next to finish indicators. Each of instructions 2, 4, and 5 were effectively delayed because these instructions were dependent upon the completion of instructions 1 and 3, however none of instructions 2, 4, and 5 caused the pipeline stall. As illustrated, stall analysis controller 402 analyzes instruction group stall record 324 and identifies that while next to finish indicators were received for instructions 2, 4, and 5, these instructions did not cause the pipeline stall. As illustrated in instruction group stall record 324, "completion stall—FXU=2" and "completion stall—BRU=1" are included, where "completion stall—FXU" has a count of 2 representing the cumulative cycles counted triggered by next to finish indicators for instruction 2 and instruction 4 and "completion stall—BRU" has a count of 1 representing the cumulative cycles counted triggered by a next to finish indicator for instruction 5.

Figure 5:
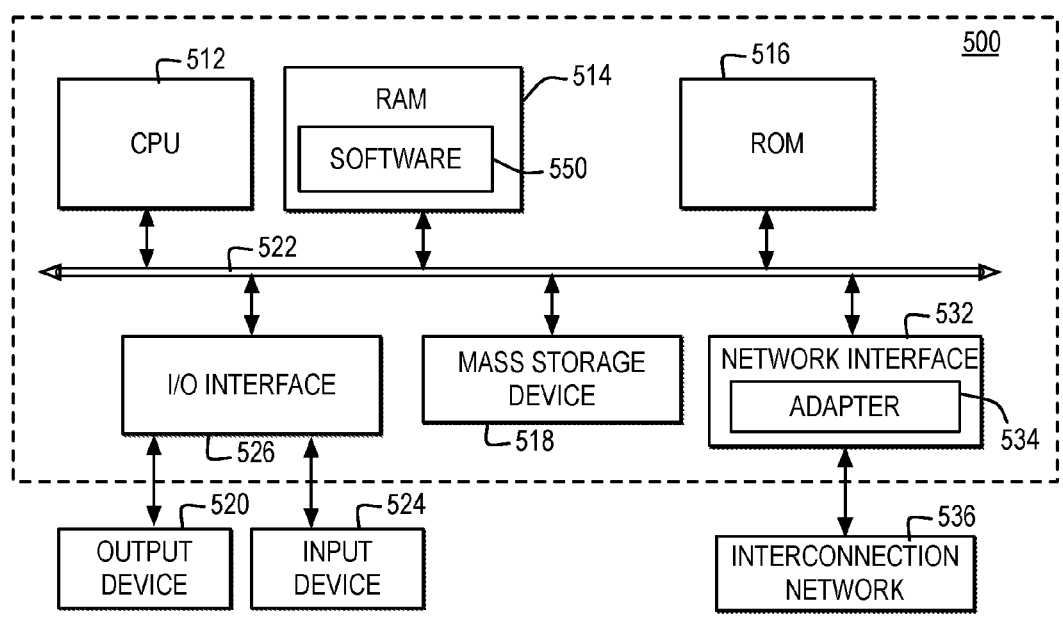
FIG. 5 is a block diagram illustrating one example of a computer system in which a processor may be implemented and monitored.

FIG. 5 illustrates one example of a computer system in which a processor may be implemented and monitored. The present invention may be performed in a variety of systems and combinations of systems, made up of functional components, such as the functional components described with reference to computer system 500 and may be communicatively connected to a network, such interconnection network 536.

Computer system 500 includes a bus 522 or other communication device for communicating information within computer system 500, and at least one hardware processing device, such as processor 512, coupled to bus 522 for processing information. Processor 512 may include one or more instances of the elements described with reference to processor 100 in FIGS. 1, 2, and 3. Bus 522 preferably includes low-latency and higher latency paths that are connected by bridges and adapters and controlled within computer system 500 by multiple bus controllers. When implemented as a server or node, computer system 500 may include multiple processors designed to improve network servicing power. Where multiple processors share bus 522, additional controllers (not depicted) for managing bus access and locks may be implemented.

Processor 512 may be at least one general-purpose processor such as IBM® PowerPC® (IBM and PowerPC are registered trademarks of International Business Machines Corporation) processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a cluster system, and a grid environment. In addition, software 950 may include a stall analysis controller, as described with reference to stall analysis controller 402 for monitoring the performance of elements within processor 512 and analyzing performance information, such as instruction group stall records, to determine which instructions within instruction groups cause stalls and the reasons for the stalls.

In one embodiment, the operations performed by processor 512 may control the operations of the flowcharts of FIGS. 6-9 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 518, a random access memory (RAM), such as RAM 514, a read-only memory (ROM) 516, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 500, partly on the user's computer, as a stand-alone software package, partly on the user's computer and partly on a remote computer or entirely on the remote computer or server. In the latter scenario, the remote computer may be connected to the user's computer through any type of network, such as interconnection network 536, through a communication interface, such as network interface 532, over a network link that may be connected, for example, to interconnection network 536.

In the example, network interface 532 includes an adapter 534 for connecting computer system 500 to interconnection network 536 through a link. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 500, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 500, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 532, the network link to interconnection network 536, and interconnection network 536 may use electrical, electromagnetic, or optical signals that carry digital data streams. The signals through the various networks and the signals on interconnection network 536, the network link to interconnection network 536, and network interface 532 which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
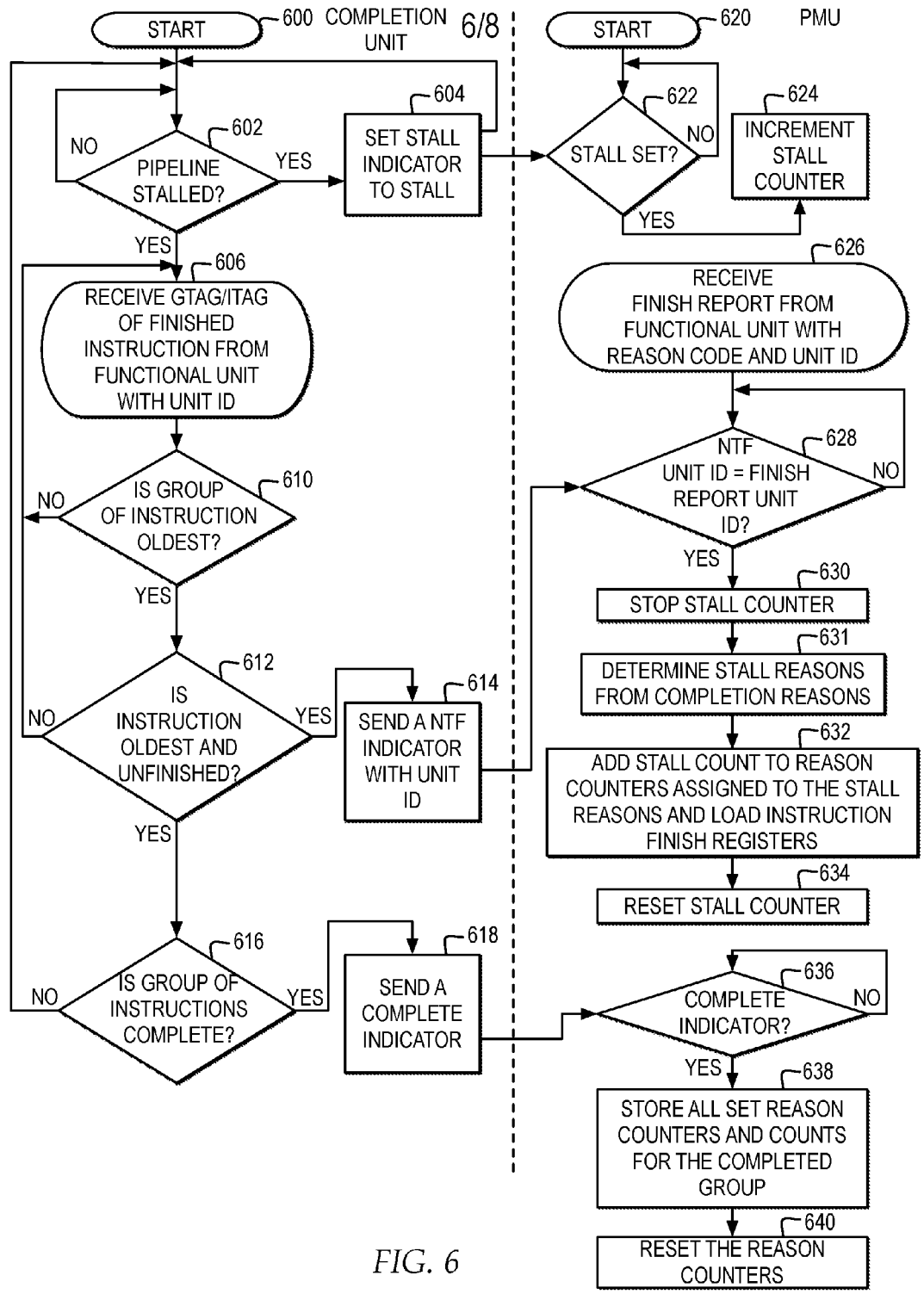
FIG. 6 is a high level logic flowchart depicting a process and program for tracking each stall reason and count for a next to finish instruction of a next to complete instruction group

With reference now to FIG. 6, a high level logic flowchart illustrates a process and program for tracking each stall reason and count for a next to finish instruction of a next to complete instruction group. In the example, the process performed by a completion unit starts at block 600 and thereafter proceeds to block 602. In addition, in the example, the process performed by a PMU starts at block 620 and thereafter proceeds to block 622. Block 602 illustrates a determination whether the pipeline is stalled. At block 602, if the pipeline is stalled, then the process passes to block 604. Block 604 illustrates setting a stall indicator to stall. At block 622, when the PMU detects that a stall indicator is set to stall, whether from the completion unit or from another functional unit, the process passes from block 622 to block 624. Block 624 depicts incrementing a stall counter. The stall counter increments a count, each cycle, until the stall counter is stopped, reset, or overflows. In one example, once a stall indicator is set for a next to complete instruction group, the stall indicator is not reset until the complete indicator is received for the next to complete instruction group.

Next, block 606 illustrates that the completion unit receives a finish report with the GTAG/ITAG for a finished instruction from a function unit with unit ID of the functional unit. Once the pipeline is stalled, when the completion unit receives a finish report for a finished instruction from the functional unit, the process passes to block 610. Block 610 illustrates a determination whether the group assigned to the finished instruction is the oldest group, as indicated by the tail pointer pointing to the entry for the group. If the group assigned to the finished instruction is not the oldest group, then the process passes to block 606. If the group assigned to the finished instruction is the oldest group, then the process passes to block 612. Block 612 depicts a determination whether the finished instruction is the oldest in the group and unfinished, as indicated by the oldest instruction pointer pointing to the entry for the instruction. If the finished instruction is the oldest in the group and unfinished, then the process passes to block 614 and block 616.

At block 614, the completion unit sends a next to finish indicator with the unit ID of the functional unit sending the finished instruction tags to the PMU. As illustrated at block 626, the PMU receives finish reports from each functional unit including a completion reason and unit ID for the functional unit. As illustrated at block 628, the PMU compares finish report unit IDs with the NTF unit ID received from the completion unit. If a particular finish report unit ID matches the NTF unit ID, then the process passes to block 630. Block 630 depicts stopping the stall counter. Next, block 631 illustrates determining one or more stall reasons from the one or more completion reasons. Next, block 632 depicts adding the current stall count to one or more reason counters assigned to the matching one or more stall reasons and loading the instruction finish registers with an instruction address and clock cycle for the finished instruction. Thereafter, block 634 depicts resetting the stall counter.

At block 616, the completion unit determines whether the instruction group of the finished instruction is complete. If the instruction group of the finished instruction is complete, then the process passes to block 618. Block 618 illustrates sending a complete indicator to the PMU. As illustrated at block 636, when the PMU receives a complete indicator, the process passes to block 638. Block 638 illustrates storing all set reason counters and counts for the complete group. Next, block 640 depicts resetting the reason counters.

Figure 7:
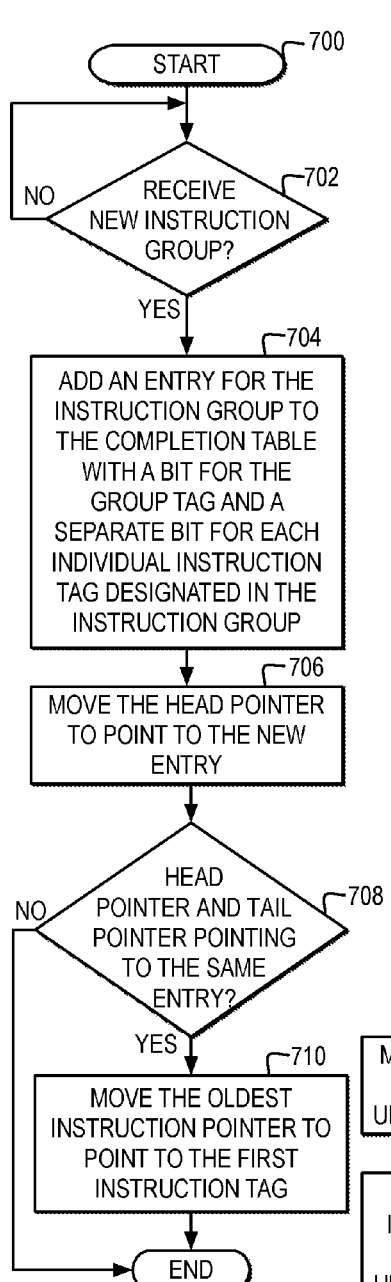
FIG. 7 is a high level logic flowchart illustrating a process and program for adding an instruction group entry to a completion table.

With reference now to FIG. 7, a high level logic flowchart depicts a process and program for adding an instruction group entry to a completion table. In the example, the process starts at block 700 and thereafter proceeds to block 702. Block 702 illustrates a determination whether a new instruction group tag is received. If a new instruction group tag is received, then the process passes to block 704. Block 704 illustrates adding an entry for the instruction group to the completion table with a bit for the group tag and a separate bit for each individual instruction tag designated for the instruction group. Next, block 706 illustrates moving the head pointer to point to the new entry. Thereafter, block 708 depicts a determination whether the head pointer and the tail pointer are pointing to the same entry. If the head pointer and tail pointer are pointing to the same entry, then the process passes to block 710. Block 710 depicts moving the oldest instruction pointer to point to the first instruction tag in the new entry for the instruction group, and the process ends. At block 708 if the head pointer and tail pointer are not pointing to the same entry, then the process ends.

Figure 8:
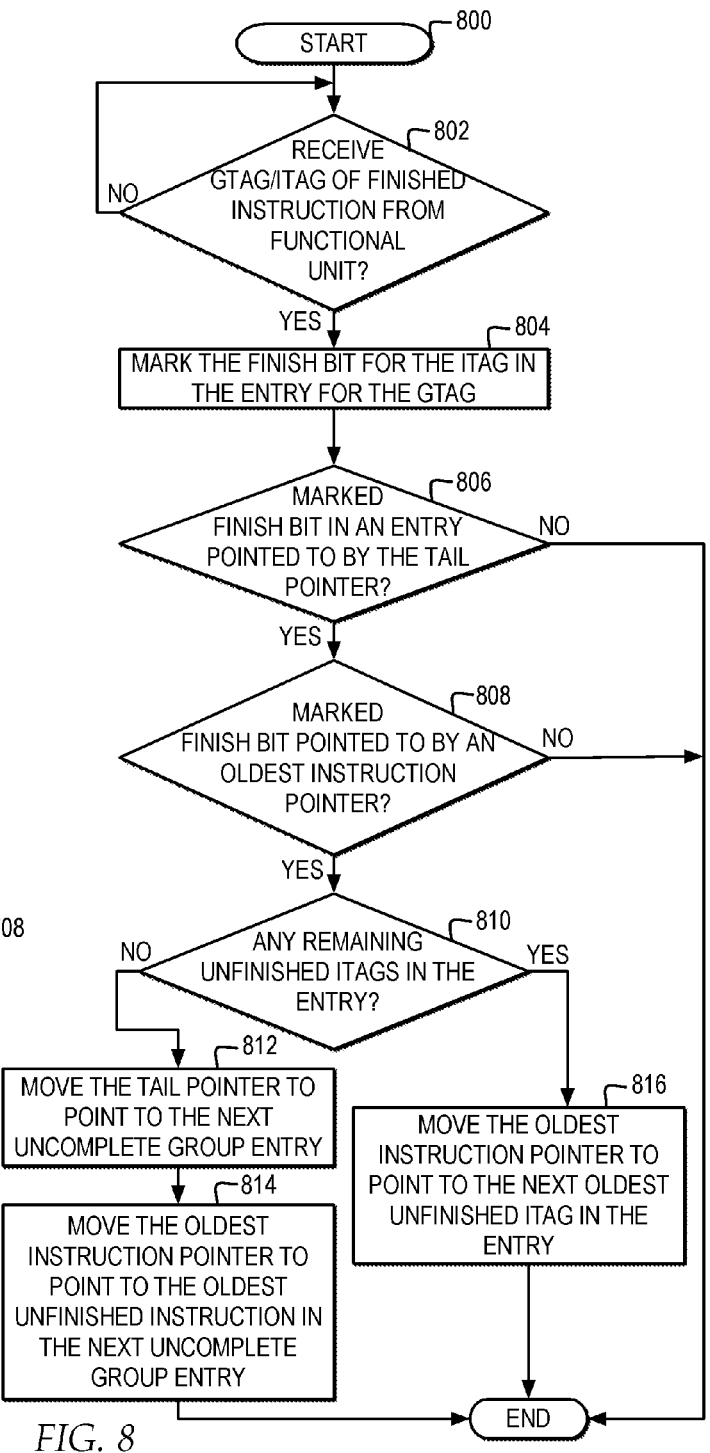
FIG. 8 is a high level logic flowchart depicting a process and program for managing a completion table to track an oldest unfinished instruction in a next to complete instruction group.

Referring now to FIG. 8, a high level logic flowchart illustrates a process and program for managing a completion table to track an oldest unfinished instruction in a next to complete instruction group. In the example, the process starts at block 800 and thereafter proceeds to block 802. Block 802 illustrates a determination whether a GTAG/ITAG of a finished instruction is received from a functional unit. If a GTAG/ITAG of a finished instruction is received from a functional unit, regardless of whether the pipeline has stalled for a next to complete instruction group, the process passes to block 804. Block 804 depicts marking the finish bit for the ITAG in the entry for the GTAG.

Next, block 806 illustrates a determination whether the marked finish bit is in an entry pointed to by the tail pointer, indicting the entry tracks the next to complete instruction group. At block 806, if the marked finish bit is not in an entry pointed to by the tail pointer, then the process ends. At block 806, if the marked finish bit is in an entry pointed to by the tail pointer, then the process passes to block 808.

Block 808 illustrates a determination whether the marked finish bit is pointed to by an oldest instruction pointer. If the marked finish bit is not pointed to by an oldest instruction pointer, then the process ends. If the marked finish bit is pointed to by an oldest instruction pointer, then the process passes to block 810.

Block 810 illustrates a determination whether there are any remaining unfinished itags in the entry. At block 810, if there are not any remaining unfinished itags in the entry, then the process passes to block 812. Block 812 illustrates moving the tail pointer to point to the next uncompleted group entry. Next, block 814 depicts moving the oldest instruction pointer to point to the oldest unfinished instruction in the next uncompleted group entry, and the process ends. Returning to block 810, if there are remaining unfinished itags in the entry, then the process passes to block 816. Block 816 illustrates moving the oldest instruction pointer to point to the next oldest unfinished itag in the group entry, and the process ends.

Figure 9:
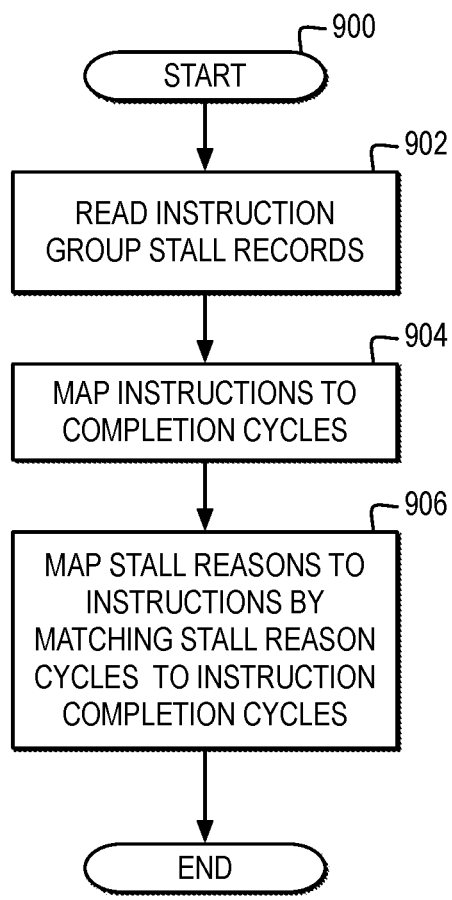
FIG. 9 is a high level logic flowchart illustrating a process and program for analyzing stall records from a performance monitoring unit.

With reference now to FIG. 9, a high level logic flowchart illustrates a process and program for analyzing stall records from a performance monitoring unit. In the example, a process starts at block 900 and thereafter proceeds to block 902. Block 902 illustrates reading instruction group stall records. In one example, stall analysis software may set a state in performance monitoring unit 160 for requesting performance monitoring unit 160 track and store instruction group stall records as described with reference to FIG. 6 and read the stored instruction group stall records. In another example, stall analysis software may read instruction group stall records directly from the registers and counters in performance monitoring unit 160.

Next, block 904 illustrates mapping instructions to completion cycles. Thereafter, block 906 depicts mapping stall reasons to instructions by matching stall reason cycles to instruction completion cycles for each stall reason, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for tracking stall reasons comprising:
   during a pipeline stall in a processor, repeating the following steps until a complete indicator of completion of a next to complete instruction group is received from a completion unit of a processor:
   incrementing a count in a counter each clock cycle;
   receiving, from the completion unit, a next to finish indicator of the finish of an oldest unfinished instruction from among a plurality of instructions of the next to complete instruction group, the next to finish indicator specifying at least one unit identifier of at least one particular functional unit from among a plurality of functional units of the processor;
   receiving, from the plurality of functional units of the processor, a plurality of finish reports indicating completion reasons for a plurality of separate instructions;
   responsive to receiving the next to finish indicator, determining whether the at least one unit identifier specified with the next to finish indicator matches a unit identifier specified in a particular finish report of the plurality of finish reports;
   responsive to the at least one unit identifier matching the unit identifier specified in the particular finish report of the plurality of finish reports, stopping the counter and deriving, from the particular finish report, at least one stall reason from among a plurality of stall reasons;
   responsive to deriving the at least one stall reason from the particular finish report, setting at least one reason counter specified for the at least one stall reason from among a plurality of reason counters each assigned a separate stall reason with the count in the counter, wherein the count in the counter indicates a number of stall cycles for execution of the next to finish instruction; and
   responsive to setting the at least one reason counter with the count in the counter, resetting the counter and setting the counter to increment for each clock cycle.

2. The method according to claim 1, further comprising:
loading a current clock cycle count when the next to finish indicator is received into a finish instruction register for holding the clock cycle count for the next to finish indicator; and
responsive to receiving the complete indicator, storing in a memory the at least one stall reason determined for each next to finish indicator from a stall reason register with the current clock cycle count for each next to finish indicator from the finish instruction register.

3. The method according to claim 1, wherein setting at least one reason counter specified for the at least one stall reason from among a plurality of reason counters each assigned a separate stall reason with the count in the counter, wherein the count in the counter indicates a number of stall cycles for execution of the next to finish instruction, further comprises:
accumulating the count in the counter with a current count in the at least one reason counter.

4. The method according to claim 1, further comprising:
receiving, by a dispatch unit, the plurality of instructions;
assigning the plurality of instructions a group identifier and assigning a separate individual identifier to each of the plurality of instructions; and
dispatching the plurality of instructions as an instruction group with the group identifier and the plurality of individual identifiers to a selection of the plurality of functional units and to the completion unit, wherein the completion unit tracks the finish of each instruction by the selection of the plurality of functional units by receiving finish reports from the plurality of functional units identifying the group identifier and a particular individual identifier.

5. A system for tracking stall reasons comprising:
a processor comprising a plurality of functional units, a completion unit, and a performance monitoring unit;
the performance monitoring unit, during a pipeline stall in the processor, operative to repeat the following steps until a complete indicator of completion of a next to complete instruction group is received from the completion unit of the processor:
the performance monitoring unit operative to increment a count in a counter each clock cycle;
the performance monitoring unit operative to receive, from the completion unit, a next to finish indicator of the finish of an oldest unfinished instruction from among a plurality of instructions of the next to complete instruction group, the next to finish indicator specifying at least one unit identifier of at least one particular functional unit from among a plurality of functional units of the processor;
the performance monitoring unit operative to receive, from the plurality of functional units of the processor, a plurality of finish reports indicating completion reasons for a plurality of separate instructions;
the performance monitoring unit, responsive to receiving the next to finish indicator, operative to determine whether the at least one unit identifier specified with the next to finish indicator matches a unit identifier specified in a particular finish report of the plurality of finish reports;
the performance monitoring unit, responsive to the at least one unit identifier matching the unit identifier specified in the particular finish report of the plurality of finish reports, operative to stop the counter and deriving, from the particular finish report, at least one stall reason from among a plurality of stall reasons;

the performance monitoring unit, responsive to deriving the at least one stall reason from the particular finish report, operative to set at least one reason counter specified for the at least one stall reason from among a plurality of reason counters each assigned a separate stall reason with the count in the counter, wherein the count in the counter indicates a number of stall cycles for execution of the next to finish instruction; and
the performance monitoring unit, responsive to setting the at least one reason counter with the count in the counter, operative to reset the counter and setting the counter to increment for each clock cycle.

6. The system according to claim 5, further comprising:
the performance monitoring unit operative to load a current clock cycle count when the next to finish indicator is received into a finish instruction register for holding the clock cycle count for the next to finish indicator; and
the performance monitoring unit, responsive to receiving the complete indicator, operative to store in a memory the at least one stall reason determined for each next to finish indicator from a stall reason register with the current clock cycle count for each next to finish indicator from the finish instruction register.

7. The system according to claim 5, further comprising:
the performance monitoring unit, operative to accumulate the count in the counter with a current count in the at least one reason counter.

8. The system according to claim 5, further comprising:
a dispatch unit of the processor operative to receive the plurality of instructions;
the dispatch unit operative to assign the plurality of instructions a group identifier and assign a separate individual identifier to each of the plurality of instructions; and
the dispatch unit operative to dispatch the plurality of instructions as an instruction group with the group identifier and the plurality of individual identifiers to a selection of the plurality of functional units and to the completion unit, wherein the completion unit tracks the finish of each instruction by the selection of the plurality of functional units by receiving finish reports from the plurality of functional units identifying the group identifier and a particular individual identifier.

9. A computer program product for tracking stall reasons, said computer program product tangibly embodied in a non-transitory computer-readable storage medium and comprising computer executable instructions which cause a computer to:
during a pipeline stall in a processor, repeat the following steps until a complete indicator of completion of a next to complete instruction group is received from a completion unit of a processor:
increment a count in a counter each clock cycle;
receive, from the completion unit, a next to finish indicator of the finish of an oldest unfinished instruction from among a plurality of instructions of the next to complete instruction group, the next to finish indicator specifying at least one unit identifier of at least one particular functional unit from among a plurality of functional units of the processor;
receive, from the plurality of functional units of the processor, a plurality of finish reports indicating completion reasons for a plurality of separate instructions;
responsive to receiving the next to finish indicator, determine whether the at least one unit identifier specified with the next to finish indicator matches a unit identifier specified in a particular finish report of the plurality of finish reports;

responsive to the at least one unit identifier matching the unit identifier specified in the particular finish report of the plurality of finish reports, stop the counter and deriving, from the particular finish report, at least one stall reason from among a plurality of stall reasons;

responsive to deriving the at least one stall reason from the particular finish report, set at least one reason counter specified for the at least one stall reason from among a plurality of reason counters each assigned a separate stall reason with the count in the counter, wherein the count in the counter indicates a number of stall cycles for execution of the next to finish instruction; and responsive to setting the at least one reason counter with the count in the counter, reset the counter and setting the counter to increment for each clock cycle.

10. The computer program product according to claim 9, further comprising computer executable instructions which cause a computer to:

load a current clock cycle count when the next to finish indicator is received into a finish instruction register for holding the clock cycle count for the next to finish indicator; and responsive to receiving the complete indicator, store in a memory the at least one stall reason determined for each next to finish indicator from a stall reason register with the current clock cycle count for each next to finish indicator from the finish instruction register.

11. The computer program product according to claim 9, further comprising computer executable instructions which cause a computer to:

accumulate the count in the counter with a current count in the at least one reason counter.

12. The computer program product according to claim 9, further comprising computer executable instructions which cause a computer to:

receive, by a dispatch unit, the plurality of instructions;

assign the plurality of instructions a group identifier and assign a separate individual identifier to each of the plurality of instructions; and dispatch the plurality of instructions as an instruction group with the group identifier and the plurality of individual identifiers to a selection of the plurality of functional units and to the completion unit, wherein the completion unit tracks the finish of each instruction by the selection of the plurality of functional units by receiving finish reports from the plurality of functional units identifying the group identifier and a particular individual identifier.

\* \* \* \* \*